US012522043B2

(12) United States Patent
Gilbert-Eyres et al.

(10) Patent No.: US 12,522,043 B2
(45) Date of Patent: Jan. 13, 2026

(54) VEHICLE SYSTEMS AND METHODS FOR SURFACE TEMPERATURE DETECTION AND SELECTIVE CLIMATE CONTROL

(71) Applicant: GM GLOBAL TECHNOLOGY OPERATIONS LLC, Detroit, MI (US)

(72) Inventors: Matthew Edward Gilbert-Eyres, Rochester, MI (US); Russell A. Patenaude, Macomb Township, MI (US); Benjamin Tran, Royal Oak, MI (US); Eric T. Hosey, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 18/355,104

(22) Filed: Jul. 19, 2023

(65) Prior Publication Data

US 2025/0026168 A1 Jan. 23, 2025

(51) Int. Cl.
*B60H 1/00* (2006.01)

(52) U.S. Cl.
CPC ..... *B60H 1/00021* (2013.01); *B60H 1/00735* (2013.01); *B60H 1/00985* (2013.01); *B60H 2001/00114* (2013.01)

(58) Field of Classification Search
None
See application file for complete search history.

(56) References Cited

U.S. PATENT DOCUMENTS

| | | | |
|---|---|---|---|
| 2014/0306838 A1* | 10/2014 | Beumler | B60N 2/272 340/988 |
| 2018/0148008 A1* | 5/2018 | Gage | B60H 1/00985 |
| 2019/0322154 A1* | 10/2019 | Ganguly | B60H 1/00742 |
| 2020/0290430 A1* | 9/2020 | Neveu | G01J 5/0003 |
| 2022/0176782 A1* | 6/2022 | West | B60H 1/00878 |
| 2024/0017583 A1* | 1/2024 | Ochsner | B60H 1/00271 |
| 2024/0102867 A1* | 3/2024 | Yi | G01K 1/024 |
| 2025/0026168 A1* | 1/2025 | Gilbert-Eyres | B60H 1/00978 |

FOREIGN PATENT DOCUMENTS

| | | |
|---|---|---|
| DE | 102017125484 A1 | 5/2018 |
| DE | 102020121646 A1 * | 2/2022 |

OTHER PUBLICATIONS

DE 102020121646 A1 English Machine Translation (Year: 2022).*
German Office Action from counterpart DE1020241205113, dated May 27, 2025.

* cited by examiner

*Primary Examiner* — Jenna M Maroney

(57) ABSTRACT

A vehicle system includes temperature sensors positioned in the vehicle and a control module in communication with the temperature sensors. The temperature sensors are configured to measure surface temperatures of objects in the vehicle. The control module is configured to receive the measured surface temperatures from the temperature sensors, determine whether any of the measured surface temperatures is greater than a defined threshold, and in response to any of the measured surface temperatures being greater than the defined threshold, transmit an alert signal to a user communication device indicative of the objects in the vehicle having the measured surface temperatures greater than the defined threshold.

20 Claims, 5 Drawing Sheets

VEHICLE SYSTEMS AND METHODS FOR SURFACE TEMPERATURE DETECTION AND SELECTIVE CLIMATE CONTROL

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and methods for surface temperature detection and selective climate control, and more particularly to vehicle systems and methods for selectively controlling airflow in vehicles and warning users of objects in vehicles having potentially dangerous surface temperatures.

Vehicles include climate control systems, such as heating, ventilation and air conditioning (HVAC) systems. The climate control systems may be used to control a cabin air temperature in the vehicles. For example, a climate control system may be used to cool or heat the cabin of a vehicle based on user controls. In such examples, a user can set a desired air temperature in the cabin, and the climate control system measures an air temperature in the cabin and then compares the measured air temperature to the set air temperature. The climate control system can then adjust the temperature of air and/or the amount of air provided through vents in the vehicle to increase or decrease the actual air temperature in the cabin unit the set air temperature is met. Such climate control may also be divided into zones (e.g., a driver zone, a passenger zone, etc.) in the cabin of the vehicle.

SUMMARY

A vehicle system for selectively controlling airflow in a vehicle is disclosed. The vehicle system includes a plurality of temperature sensors positioned in the vehicle and a control module in communication with the plurality of temperature sensors. The plurality of temperature sensors are configured to measure surface temperatures of objects in the vehicle. The control module is configured to receive the measured surface temperatures from the plurality of temperature sensors, determine whether any of the measured surface temperatures is greater than a defined threshold, and in response to any of the measured surface temperatures being greater than the defined threshold, transmit an alert signal to a user communication device indicative of the objects in the vehicle having the measured surface temperatures greater than the defined threshold.

In other features, the control module is configured to, in response to one of the measured surface temperatures being greater than the defined threshold, identify at least one zone in the vehicle that directs airflow to the object having the measured surface temperature that is greater than the defined threshold and selectively control a climate control module to cool the zone in the vehicle.

In other features, the control module is configured to selectively control the climate control module to cool the zone in the vehicle until the measured surface temperature is less than the defined threshold.

In other features, the control is configured to determine whether one of the objects in the vehicle having the measured surface temperatures greater than the defined threshold is touched for a defined period of time, and in response to determining that one of the objects is touched for the defined period of time, transmit an emergency signal to a user communication device.

In other features, the plurality of temperature sensors includes at least one infrared temperature sensor.

In other features, at least one temperature sensor of the plurality of temperature sensors is configured to measure a surface temperature of a seat, a center console, a steering wheel, an arm rest, or a child car seat.

In other features, at least one temperature sensor of the plurality of temperature sensors is an infrared temperature sensor configured to measure a surface temperature of a seat, a center console, a steering wheel, an arm rest, or a child car seat.

In other features, the control module is configured to, in response to one of the measured surface temperatures being greater than the defined threshold, identify at least one zone in the vehicle that directs airflow to the object having the measured surface temperature that is greater than the defined threshold, and selectively control a climate control module to cool the zone in the vehicle until the measured surface temperature is less than the defined threshold.

A method for selectively controlling airflow in a vehicle is disclosed. The method includes receiving, from a plurality of temperature sensors, measured surface temperatures of objects in the vehicle, determining whether any of the measured surface temperatures is greater than a defined threshold, and in response to any of the measured surface temperatures being greater than the defined threshold, transmitting an alert signal to a user communication device indicative of the objects in the vehicle having the measured surface temperatures greater than the defined threshold.

In other features, the method further includes identifying at least one zone in the vehicle that directs airflow to at least one of the objects having with the measured surface temperature that is greater than the defined threshold and selectively controlling a climate control module to cool the zone in the vehicle.

In other features, selectively controlling the climate control module to cool the zone in the vehicle includes selectively controlling the climate control module to cool the zone in the vehicle until the measured surface temperature is less than the defined threshold.

In other features, the method further includes determining whether one of the objects in the vehicle having the measured surface temperatures greater than the defined threshold is touched for a defined period of time, and in response to determining that one of the objects is touched for the defined period of time, transmitting an emergency signal to a user communication device.

In other features, the plurality of temperature sensors includes at least one infrared temperature sensor.

In other features, receiving surface temperatures of objects in the vehicle includes receiving surface temperatures of a seat, a center console, a steering wheel, an arm rest, and/or a child car seat.

A method for warning users of objects of a vehicle having potentially dangerous surface temperatures is disclosed. The method includes receiving data associated with the vehicle and data associated with an environment around the vehicle, estimating a surface temperature of an object of the vehicle based on the received data, determining whether the estimated surface temperature of the object is greater than a defined threshold, and in response to determining the estimated surface temperature of the object is greater than the defined threshold, transmitting an alert signal to a user communication device to notify a user of the object having a potentially dangerous surface temperature.

In other features, the method further includes generating one or more recommendations to decrease the estimated surface temperature of the object in response to determining the estimated surface temperature of the object is greater than the defined threshold.

In other features, transmitting the alert signal to the user communication device includes transmitting the alert signal with the one or more recommendations.

In other features, the method further includes controlling a climate control module in the vehicle to cool the object having the potentially dangerous surface temperature in response to determining the estimated surface temperature of the object is greater than the defined threshold.

In other features, receiving data associated with the vehicle includes receiving one or more of a color of the object in the vehicle, a vehicle heading, a pitch of the vehicle, a yaw of the vehicle, a latitude and longitude of the vehicle, a material type of the object in the vehicle.

In other features, receiving data associated with the environment around the vehicle includes receiving one or more of current weather data, forecasted weather data, a time of the year, an angle of the sun, and temporal data.

In other features, the object includes a component external to the vehicle.

In other features, the method further includes estimating a time of when the surface temperature of the object in the vehicle will be greater than the defined threshold based on the received data, wherein transmitting the alert signal to the user communication device includes providing a notification identifying the estimated time of when the surface temperature of the object in the vehicle will be greater than the defined threshold.

In other features, the method further includes estimating a time of when the surface temperature of the object in the vehicle will be less than the defined threshold based on the received data, wherein transmitting the alert signal to the user communication device includes providing a notification identifying the estimated time of when the surface temperature of the object in the vehicle will be less than the defined threshold.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
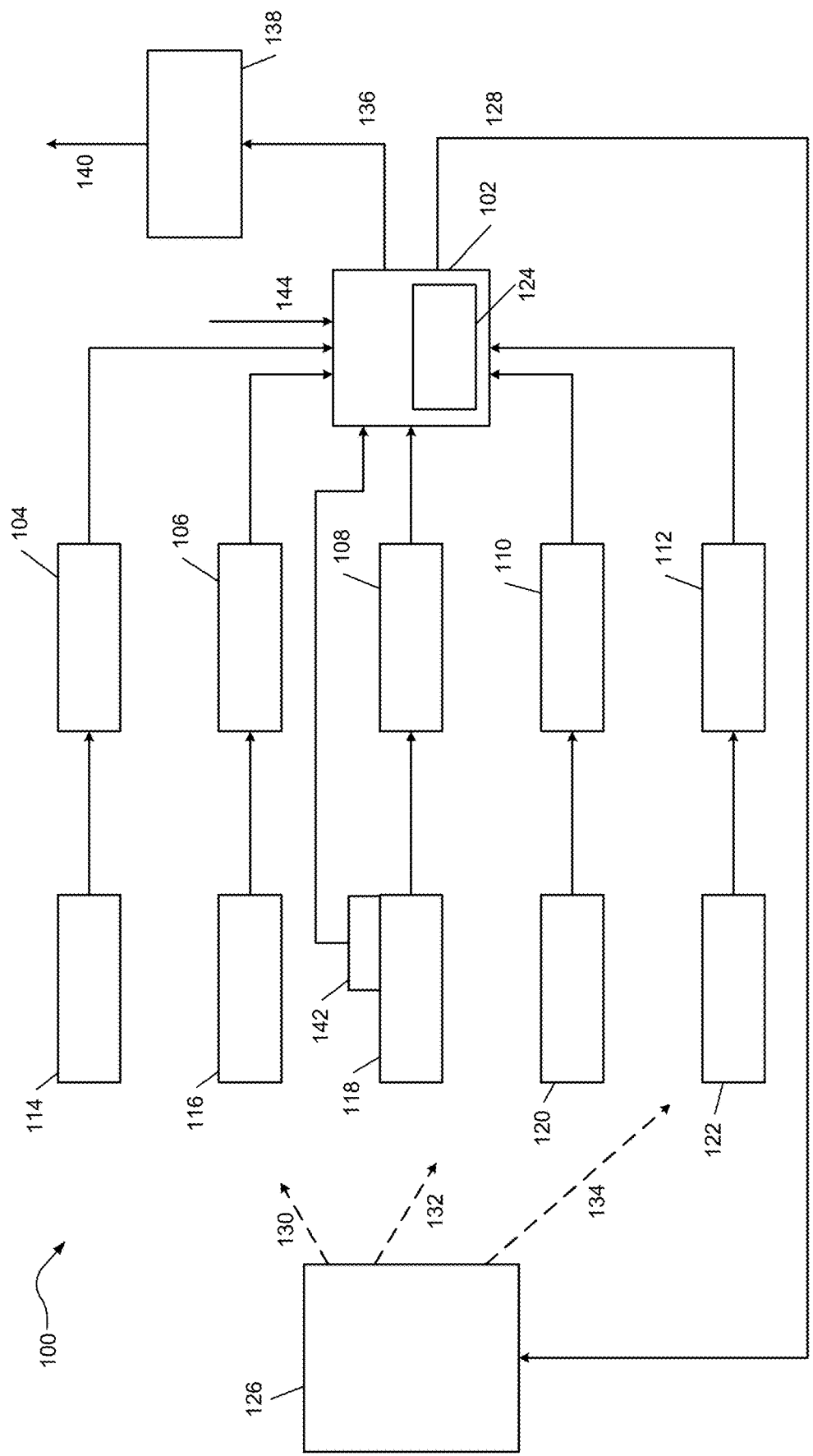
FIG. 1 is a functional block diagram of an example vehicle system including a control module for selectively controlling airflow in a vehicle and/or predicting and warning users of potentially dangerous surface temperatures of the vehicle, according to the present disclosure.

Vehicles include climate control systems for controlling cabin air temperatures based on user inputs and measured air temperatures in the cabin. However, such temperature controls lack the ability to adjust settings based on other measured temperatures in the vehicles. For example, while the cabin air temperature in a vehicle may be within a desired temperature range (e.g., set by a user, etc.), surface temperatures of objects (e.g., seats, arm rests, center consoles, child car seats, door handles, trim, etc.) internal and/or external of the vehicle may be much higher and potentially dangerous to touch. Such high surface temperatures therefore may pose a risk to drivers, passengers (e.g., children, etc.) and/or other occupants of the vehicle.

Vehicle systems and methods according to the present disclosure provide solutions for enabling selective climate control in a vehicle based on measured surface temperatures of vehicle objects and/or user notification of potentially dangerous surface temperatures of the objects. For example, the vehicle systems and methods herein may provide a reactive solution by detecting a potentially dangerous condition, automatically taking actions to mitigate the condition, and alerting an occupant of the vehicle of the detected condition. Additionally and/or alternatively, the vehicle systems and methods may provide a proactive or preventative solution by estimating surface temperatures of objects internal and/or external of the vehicle based on received internal and/or external data, and then alerting users if the estimated surface temperatures are potentially high, thereby allowing the users or the vehicle climate control to take actions to help reduce the chances of the objects inside or outside of the vehicle of reaching these unsafe temperatures. As such, through the reactive and/or proactive solutions, potentially dangerous surface temperature conditions may be detected and mitigated, thereby resulting in improved occupant safety.

For example, a vehicle system may include a control module that receives measured surface temperatures from temperature sensors in a vehicle, determines whether any of the measured surface temperatures is greater than a defined threshold, and if so, transmits an alert signal to a user communication device indicative of the objects in the vehicle having the measured surface temperatures greater than the defined threshold. In such examples, the control module may identify a zone in the vehicle that directs airflow to the object having the measured surface temperature that is greater than the defined threshold and selectively control a climate control module to cool the zone in the vehicle. Additionally and/or alternatively, the control module of the vehicle system may receive vehicle data and environment data, estimate a surface temperature of an object of the vehicle based on the received data, determine whether the estimated surface temperature of the object is greater than a defined threshold, and if so, transmit an alert signal to a user communication device to notify a user of the object having a potentially dangerous surface temperature.

Referring now to FIG. 1, a functional block diagram of an example vehicle system 100 is presented. The vehicle system 100 may be employable with any suitable vehicle, such as an electric vehicle (e.g., a pure electric vehicle, a plug-in hybrid electric vehicle, etc.), an internal combustion engine vehicle, etc. Additionally, the vehicle system may be applicable to an autonomous vehicle, a semi-autonomous vehicle, or a non-autonomous vehicle.

As shown in FIG. 1, the vehicle system 100 generally includes a control module 102 and temperature sensors 104, 106, 108, 110, 112 in communication with the control module 102. For example, the temperature sensors 104, 106, 108, 110, 112 may be positioned in the vehicle to measure surface temperatures of various vehicle objects. More specifically, and as shown in FIG. 1, the temperature sensors 104, 106, 108, 110, 112 may measure surface temperatures of a steering wheel 114, a driver seat 116, a center console 118, a passenger arm rest 120, and a child car seat 122, respectively. While the vehicle system 100 of FIG. 1 is shown as including five temperature sensors for measuring surface temperatures of specific objects, it should be appreciated that the vehicle system 100 and/or other example vehicle systems may include more or less temperature sensors for measuring the same or different objects in the vehicle. Additionally, in some examples, the vehicle system 100 and/or other example vehicle systems may utilize multiple temperature sensors (e.g., the temperature sensors 104, 106) to measure the surface temperature of one object (e.g., the driver seat) or surface temperatures at different portions of the same object.

In the example of FIG. 1, the vehicle system 100 is shown as monitoring surface temperatures of the steering wheel 114, the driver seat 116, the center console 118, the passenger arm rest 120, and the child car seat 122. In other examples, the vehicle system 100 may monitor surface temperatures of other suitable objects, such as one or more handles (e.g., door handles, passenger safety handles, etc.), windows, and/or any other common touch points internal and/or external of the vehicle.

Each temperature sensor 104, 106, 108, 110, 112 may be any suitable type of sensor. For example, in the embodiment of FIG. 1, the temperature sensors 104, 106, 108, 110, 112 may be integrated infrared (IR) sensors and/or thermal imaging temperature sensors. Regardless of the particular type, the temperature sensors 104, 106, 108, 110, 112 may measure the surface temperatures of the monitored objects and then send the measured surface temperatures to the control module 102. Alternatively, the temperature sensors 104, 106, 108, 110, 112 may send data indicative of the measured surface temperatures to the control module 102, which may then calculate or otherwise determine the surface temperatures.

In various embodiments, the control module 102 may determine whether any of the received measured surface temperatures is greater than a defined threshold. For example, the control module 102 may compare each received measured surface temperature to the same threshold or different thresholds. In some examples, the defined threshold may be, for example, 118 degrees Fahrenheit or another suitable temperature (e.g., 100 degrees Fahrenheit, 110 degrees Fahrenheit, 115 degrees Fahrenheit, etc.). In such examples, the threshold may be stored in memory, such as in a memory circuit 124 within in the control module 102 as shown in FIG. 1 or a memory circuit external to the control module 102.

The defined threshold may be selected such that mitigating measures may be taken to prevent harm to an occupant of the vehicle. For example, at 118 degrees Fahrenheit, an occupant's skin may begin to sustain first-degree burns. As such, the defined threshold may be set at or below 118 degrees Fahrenheit to mitigate such harm. In some examples, the defined threshold may be set and/or adjusted as desired. For example, an occupant of the vehicle may set and/or adjust the threshold for each object based on user input.

After the control module 102 determines that one or more of the received measured surface temperatures is greater than the defined threshold, the control module 102 may take various reactive actions to mitigate such high (and potentially dangerous) surface temperatures. For example, the control module 102 may identify a zone (e.g., a driver zone, a passenger zone, a rear zone, a front zone, a front driver zone, a front passenger zone, a rear driver zone, a rear passenger zone, etc.) in the vehicle that directs airflow to the object having the measured surface temperature that is greater than the defined threshold. In such examples, the zone that is best suited to direct airflow (e.g., targeted airflow) to the hot object may be identified. For example, the control module 102 may generally know where in the vehicle each temperature sensor 104, 106, 108, 110, 112 is installed. In other examples, the control module 102 may know an association between each temperature sensor 104, 106, 108, 110, 112 and a particular known object in the vehicle, and the object's location in the vehicle. In such examples, the control module 102 may tie a received surface temperature from any one of the temperature sensor 104, 106, 108, 110, 112 to a particular zone in the vehicle.

Then, the control module 102 can selectively control a climate control module 126 to cool the identified zone in the vehicle associated with each measured surface temperature. For example, once the zone is identified, the control module 102 may automatically send a control signal 128 to the climate control module 126 to instruct the climate control module 126 to activate one or more cooling features for the identified zone. In such examples, the climate control module 126 may dynamically adjust the temperature of air and/or the amount of air provided through vents in the vehicle to decrease the surface temperatures of objects in the zone. Such adjustment (e.g., the amount, the temperature, etc.) of the airflow may be accomplished with a HVAC system in the vehicle.

For example, the control module 102 may identify a driver zone as being associated with an elevated surface temperature of the steering wheel 114 as measured by the temperature sensor 104, the driver seat 116 as measured by the temperature sensor 106, and/or the center console 118 as measured by the temperature sensor 108. In such examples, the control module 102 may then instruct the climate control module 126 (via the control signal 128) to activate cooling feature(s) to change the amount and/or temperature of airflow (shown by arrow 130) in the driver zone. Additionally and/or alternatively, the control module 102 may identify a passenger zone as being associated with an elevated surface temperature of the passenger arm rest 120 as measured by the temperature sensor 110 and/or the center console 118 as measured by the temperature sensor 108, and then instruct the climate control module 126 to activate cooling feature(s) to change the airflow (shown by arrow 132) in the passenger zone. In still other embodiments, the control module 102 may identify a rear zone as being associated with an elevated surface temperature of the child car seat 122 as measured by the temperature sensor 112, and then instruct the climate control module 126 to activate cooling feature(s) to change the airflow (shown by arrow 134) in the rear zone.

In various embodiments, the control module 102 may continue to control the climate control module 126 to cool the identified zone until the surface temperature of the particular monitored object falls below the defined threshold. For example, if the climate control module 126 is controlled to change the airflow in the rear zone due to an elevated surface temperature of the child car seat 122, such control may continue until another measured surface temperature of the child car seat 122 is less than the defined threshold (e.g., 118 degrees Fahrenheit, etc.). At that point, the control module 102 may allow the climate control module 126 to revert back to a default cooling operation, a previously set cooling operation, etc.

In some embodiments, the control module 102 may alert occupant(s) inside or outside the vehicle of any objects having the elevated and potentially dangerous surface temperatures. For example, the control module 102 may send a signal 136 (e.g., an alert signal) to a user communication device 138 indicative of any object of the vehicle having a measured surface temperature greater than the defined threshold. In such examples, the user communication device 138 may be a personal user device (e.g., cell phone, a tablet, etc.) in communication with the control model 102 and that is capable of warning a user. For example, the user communication device 138 may be connected (e.g., wirelessly or wired) to a communication module in the vehicle. In some examples, the user communication device 138 may receive the alert signal via cellular networks. In other examples, the user communication device 138 may be a user display in the vehicle (e.g., in a user control center of the vehicle, etc.). In such examples, the user communication device 138 may receive the alert signal and then display or otherwise notify (e.g., via an audible warning, another visual warning, etc.) occupant(s) of the vehicle.

In various embodiments, the control module 102 may automatically notify an emergency service provider when one or more conditions are met. For example, after determining that an object (e.g., the child car seat 122, etc.) has a surface temperature greater than the defined threshold, the control module 102 may determine whether that object is being touched. Then, in response, the control module 102 may transmit the signal 136 (e.g., an emergency signal) to the user communication device 138. After the emergency signal is received, the user communication device 138 automatically notifies (e.g., via a signal 140) an emergency service provider (e.g., 911, a first responder, etc.).

In some examples, the control module 102 may only notify the emergency service provider if the detected touching of the object lasts for a defined period of time. For example, if the occupant (e.g., a child, an animal, etc.) touches the hot object for a period of time that would indicate a burn that might require emergency assistance, the control module 102 may automatically notify the emergency service provider via, for example, the user communication device 138. In such examples, the period of time may be any suitable duration depending on, for example, the defined temperature threshold. For example, if the defined temperature threshold is below 118 degrees Fahrenheit, the defined period of time may be larger than if the defined temperature threshold is at or greater than 118 degrees Fahrenheit. As examples only, the defined period of time may be three seconds, five seconds, seven seconds, ten seconds, etc. if the defined temperature threshold is at or greater than 118 degrees Fahrenheit and five seconds, ten seconds, fifteen seconds, thirty seconds, one minute, etc. if the defined temperature threshold is less than 118 degrees Fahrenheit.

The control module 102 may determine whether an object is being touched in various manners. For instance, one or more objects of the vehicle may include a dedicated sensor for detecting a touch. For example, and as shown in FIG. 1, the center console 118 includes a sensor 142 in communication with the control module 102. In such examples, the sensor 142 may be a touch sensor, a pressure sensor, etc. capable of detecting an occupant touching the object, and then sending a signal to the control signal 102. In other examples, the vehicle system 100 may include other sensors, such as cameras, that monitor particular objects of the vehicle and then notify the control module 102 when the objects are touched.

In various embodiments, the vehicle system 100 of FIG. 1 may utilize data to predict whether surfaces of vehicle objects have the potential to heat up to, for example, a dangerous level, and then provide proactive alerts to users (e.g., drivers, vehicle owners, potential vehicle occupants, etc.). For example, the surface temperatures of internal and/or external objects (e.g., child car seats, door handles, arm rests, the trim, etc.) of the vehicle may increase due to the location (e.g., a latitude and longitude) of the vehicle (when stationary), the orientation of the vehicle (e.g., the heading, the pitch, the roll, the yaw, etc.), the color and/or material of the objects, the weather, the time of day, the time of year, the location of the sun, etc. As such, based on such data and/or other types of data, the control module 102 may estimate potential surface temperatures of the vehicle and then transmit the signal 136 (e.g., an alert signal) to the user communication device 138 (e.g., a user's cell phone, a tablet, etc.) to notify the user of vehicle objects having potentially dangerous surface temperatures. In such examples, the control module 102 may estimate the potential of hot surfaces with or without input from the temperature sensors 104, 106, 108, 110, 112.

For example, the control module 102 may receive data from various internal and/or external sources. For instance, the control module 102 may receive data associated with the vehicle from the memory circuit 124 and/or another memory circuit in the vehicle. In such examples, the vehicle data may include the parked vehicle location, the vehicle heading, the vehicle pitch, the vehicle roll, the vehicle yaw, the color and/or material (e.g., metal, plastic, etc.) of the objects, etc. In other examples, such vehicle data may be stored at an external source (e.g., a server, etc.) and provided to the control module 102 via a data signal 144 as shown in FIG. 1. Additionally, the control module 102 may receive data associated with an environment around the vehicle. Such data may include, for example, the time of day (e.g., temporal data), the angle of the sun, current weather conditions (e.g., a current air temperature at or near the location of the vehicle, etc.), future weather conditions (e.g., a forecasted air temperature at or near the location of the vehicle, etc.), etc. In such examples, the environment data may be received from the memory circuit 124 and/or another memory circuit in the vehicle, received from an external source via the data signal 144, etc.

Then, based on the received data, the control module 102 may predict whether surfaces of vehicle objects have the potential to heat up to dangerous levels. In some examples, such predictions may be determined through machine learning. For instance, the received data may be analyzed along with previously collected data (e.g., from the same vehicle or different vehicles) through one or more machine learning algorithms. In doing so, the control module 102 may estimate potential surface temperatures of vehicle objects based on the received data and then determine whether any of the estimated surface temperatures of the object is greater than a defined threshold (e.g., 118 degrees Fahrenheit, etc.) to predict whether the vehicle objects have the potential to heat up to dangerous levels.

The control module 102 may then transmit the signal 136 to the user communication device 138 in response to determining the estimated surface temperature of the object is greater than the defined threshold. In doing so, the control module 102 provides a notification to a user that objects of the vehicle have the potential to have dangerous surface temperatures.

In some examples, the control module 102 may predict and notify users of what surfaces and/or zones of the vehicle that will likely be hot at different times. For example, the control module 102 may predict whether an object (e.g., a door handle, etc.) in a particular zone (e.g., a driver zone, a passenger zone, etc.) may have an elevated surface temperature at different times of the day and at different durations. For instance, a driver side door handle in the driver zone may have a potential for an elevated surface temperature before 2 PM if the vehicle is parked (and off) at a particular location for 30 minutes and a passenger side door handle in the passenger zone may have a potential for an elevated surface temperature before 2 PM if the vehicle is parked (and off) at the same location for 45 minutes. This analysis may be provided to the user via the signal 136.

Additionally, in some examples, the control module 102 may suggest one or more corrective actions for mitigating such potential for elevated surface temperatures of the vehicle. For example, the control module 102 may generate one or more recommendations to decrease an estimated surface temperature of a vehicle object, and then transmit the recommendation(s) to the user communication device 138 via the signal 136. For instance, the control module 102 may suggest moving the vehicle, adjusting (or adding) an interior vehicle shade in a particular zone, powering the vehicle on to activate the climate control module 126, etc. In such examples, moving the vehicle may include, for example, positioning the vehicle at a different angle (e.g., relative to the sun), moving the vehicle to a different location, moving the vehicle at a particular time of day, etc.

In some embodiments, the control module 102 may take actions to reduce the chances of the vehicle objects from reaching unsafe temperatures after determining the estimated surface temperature of an object is greater than the defined threshold. For example, the control module 102 may control the climate control module 126 in the vehicle to cool an object in the vehicle having the potentially dangerous surface temperature. In such examples, the climate control module 126 may be powered by a main battery and/or one or more auxiliary batteries in the vehicle. In other examples, the control module 102 may automatically lower an interior vehicle shade (e.g., along a window, etc.) and/or take other remedial actions if desired.

Figure 2:
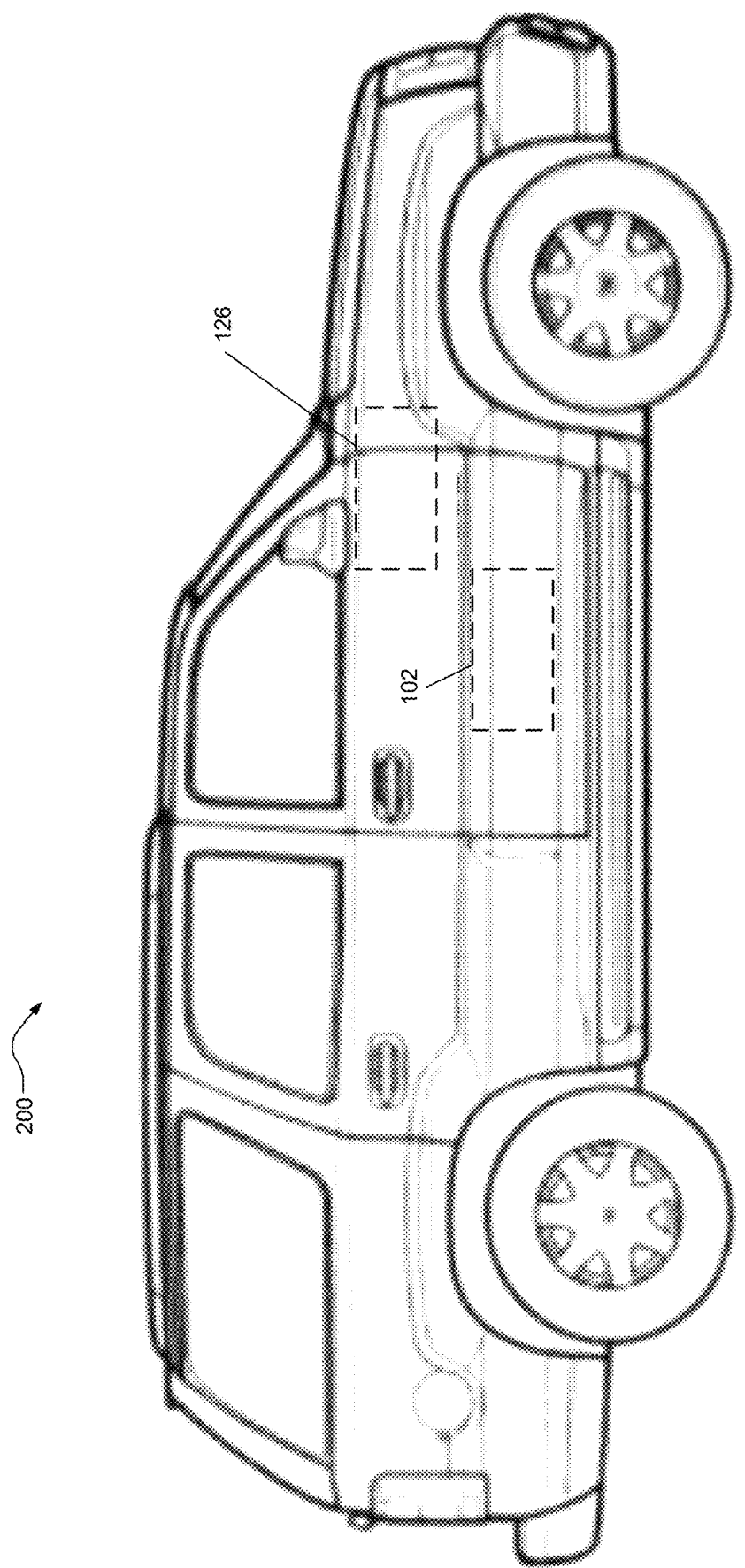
FIG. 2 is a functional block diagram of a vehicle including portions of the vehicle system of FIG. 1 according to the present disclosure.

In various embodiments, the vehicle system 100 of FIG. 1 or portions thereof may be implemented in any suitable vehicle. For example, FIG. 2 is a side view of a vehicle 200 including the control module 102 and the climate control module 126 of FIG. 1. Although not shown in FIG. 2, the vehicle 200 may also include other components, such as the various objects, the user communication device 138, the temperature sensors 104, 106, 108, 110, 112, etc. referenced above relative to FIG. 1.

In the embodiment of FIG. 2, the vehicle 200 is shown as a sports utility vehicle (SUV) with an internal combustion engine. In other embodiments, the vehicle 200 may be another suitable type of vehicle, such as an electric vehicle (e.g., a pure electric vehicle, a plug-in hybrid electric vehicle, etc.). Additionally, while the vehicle system 100 is shown as being included in the vehicle 200, it should be appreciated that the vehicle system 100 of FIG. 1 or portions thereof may be implemented in other vehicles, such as trucks, vans, cars, etc.

Figure 3:
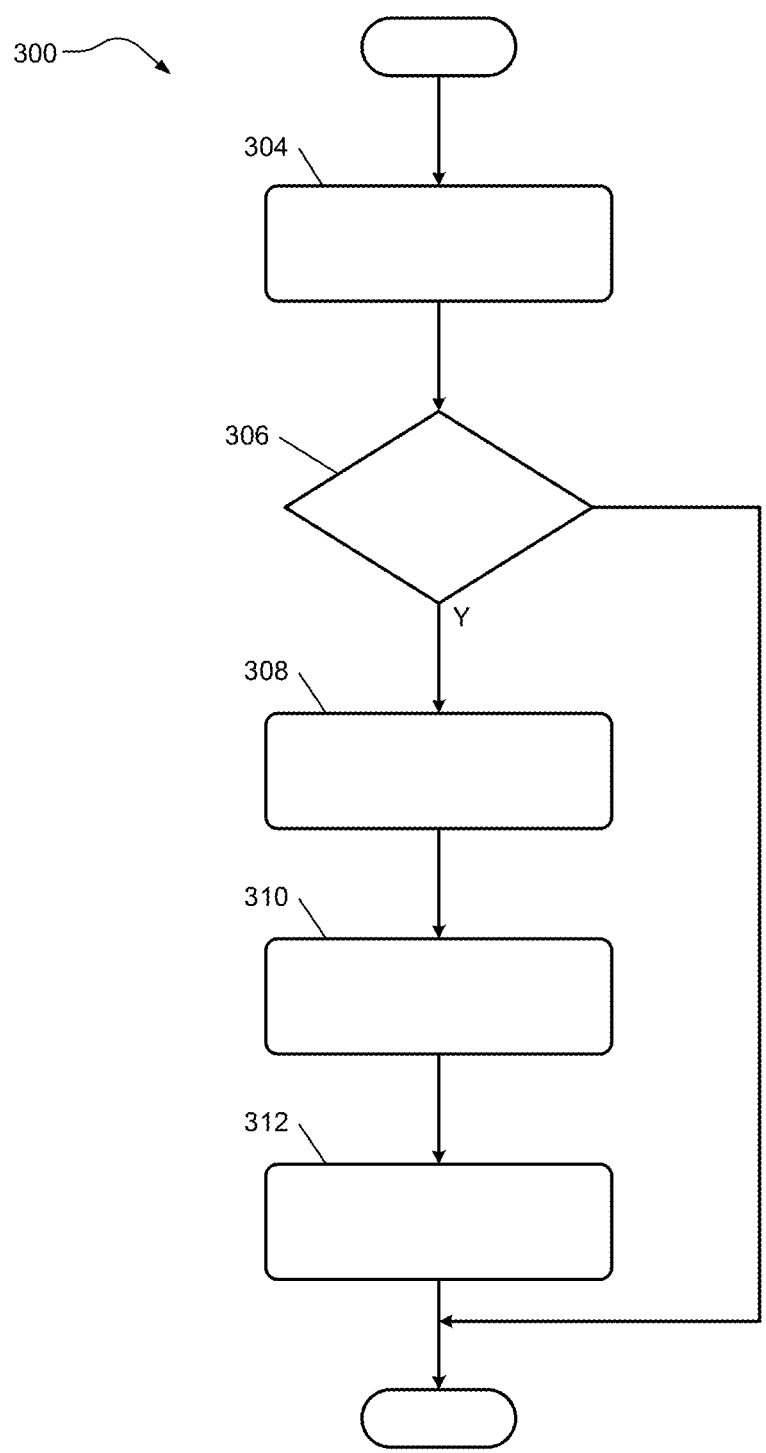
FIG. 3 is a flowchart of an example control process for selectively controlling airflow in a vehicle according to the present disclosure.
Figure 4:
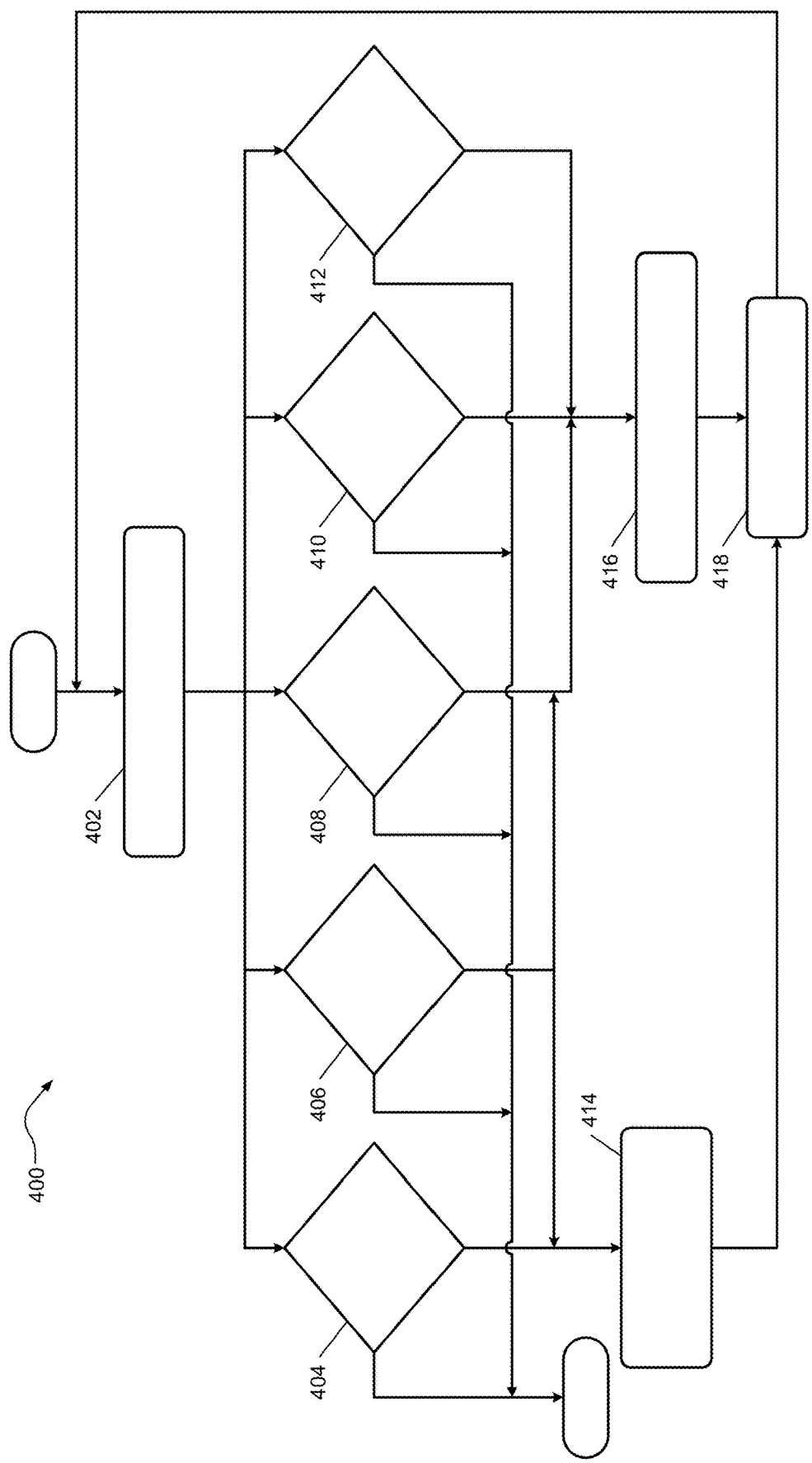
FIG. 4 is a flowchart of another example control process for selectively controlling airflow in a vehicle according to the present disclosure.

FIGS. 3 and 4 illustrate example control processes 300, 400 employable by the control module 102 of FIG. 1 for selectively controlling airflow (e.g., the amount and/or temperature of airflow) in a vehicle, such as the vehicle 200 of FIG. 2. Although the example control processes 300, 400 are described in relation to the vehicle system 100 of FIG. 1 including the control module 102, one or both of the control processes 300, 400 may be employable by any suitable system. In the example of FIGS. 3 and 4, the control processes 300, 400 may start when the vehicle system 100, the control module 102, etc. is powered-on and/or at another suitable time.

As shown in FIG. 3, control begins at 304, where the control module 102 receives measured surface temperatures of various objects in the vehicle from one or more of the temperature sensors 104, 106, 108, 110, 112. For example, and as explained above, the temperature sensors 104, 106, 108, 110, 112 may be positioned in the vehicle to measure surface temperatures of the steering wheel 114, the driver seat 116, the center console 118, the passenger arm rest 120, the child car seat 122 and/or other common touch points in the vehicle. Control proceeds to 306.

At 306, the control module 102 determines whether any of the measured surface temperatures is greater than a defined threshold. For example, the control module 102 may compare each received measured surface temperature (or a representation of the measured surface temperature) to the same threshold or different thresholds. As explained above, the threshold(s) may be, for example, 100 degrees Fahrenheit, 110 degrees Fahrenheit, 115 degrees Fahrenheit, 118 degrees Fahrenheit, etc. If any of the measured surface temperatures is greater than the defined threshold, control proceeds to 308. Otherwise, control may end as shown in FIG. 3 or return to 304 if desired.

At 308, the control module 102 identifies a zone in the vehicle that directs airflow to the object having the measured surface temperature that is greater than the defined threshold, as explained above. For example, the control module 102 may identify particular zones (e.g., a driver zone, a passenger zone, etc.) based on stored locations of the temperature sensors 104, 106, 108, 110, 112 and the monitored objects, stored associations between the temperature sensors 104, 106, 108, 110, 112 and the monitored objects, etc. Control proceeds to 310.

At 310, the control module 102 transmits an alert signal to a user communication device (e.g., the user communication device 138 of FIG. 1) indicative of the objects in the vehicle having the measured surface temperatures greater than the defined threshold, as explained herein. In this manner, the control module 102 may alert occupant(s) in the vehicle of any objects in the vehicle having the elevated and potentially dangerous surface temperatures. Control proceeds to 312.

At 312, the control module 102 selectively controls a climate control module (e.g., the climate control module 126 of FIG. 1) to cool the zone in the vehicle associated with each measured surface temperature. For example, and as explained herein, once a particular zone is identified, the control module 102 may automatically instruct the climate control module (e.g., via a control signal) to activate one or more cooling features for the identified zone. In this manner, the climate control module may dynamically adjust the temperature of air and/or the amount of air provided through vents in the vehicle to decrease the surface temperatures of objects in the zone. Control may then end as shown in FIG. 3 or return to 304 if desired.

With reference to FIG. 4, control begins at 402 where the control module 102 receives measured surface temperatures of various objects in the vehicle from one or more of the temperature sensors 104, 106, 108, 110, 112 as explained above.

Control then proceeds to 404, 406, 408, 410, 412 where various determinations are made separately and in parallel by the control module 102 with respect to different objects in the vehicle. For example, the control module 102 determines whether a surface temperature of a passenger seat is greater than a defined threshold (e.g., 100 degrees Fahrenheit, 110 degrees Fahrenheit, 115 degrees Fahrenheit, 118 degrees Fahrenheit, etc.) at 404, a surface temperature of a center console is greater than the defined threshold at 406, a surface temperature of a steering wheel is greater than the defined threshold at 408, a surface temperature of a driver seat is greater than the defined threshold at 410, and a surface temperature of a driver arm rest is greater than the defined threshold at 412. If no at any of 404, 406, 408, 410, 412, control ends for that particular path. For example, if the surface temperatures of the passenger seat and the driver sear are less than the defined threshold at 404, 410, control ends for both paths. If yes at any of 404, 406, 408, 410, 412, control may proceed to different paths.

For example, if the surface temperature of the passenger seat is greater than the defined threshold at 404, control proceeds to 414 where the control module 102 selectively controls a climate control module (e.g., the climate control module 126 of FIG. 1) to cool a passenger zone in the vehicle. Additionally, if the surface temperature of the steering wheel, the driver seat, and/or the driver arm rest are greater than the defined threshold at 408, 410, 412, control proceeds to 416 where the control module 102 selectively controls the climate control module to cool a driver zone in the vehicle. Further, if the surface temperature of the center console is greater than the defined threshold at 406, control may proceed to both 414, 416. Control then proceeds to 418.

At 418, control includes waiting a period of time before returning to 402 to receive newly measured surface temperatures. For example, at 418, the control module 102 may initiate a timer. Once a period of time has passed, control may return to 402.

Figure 5:
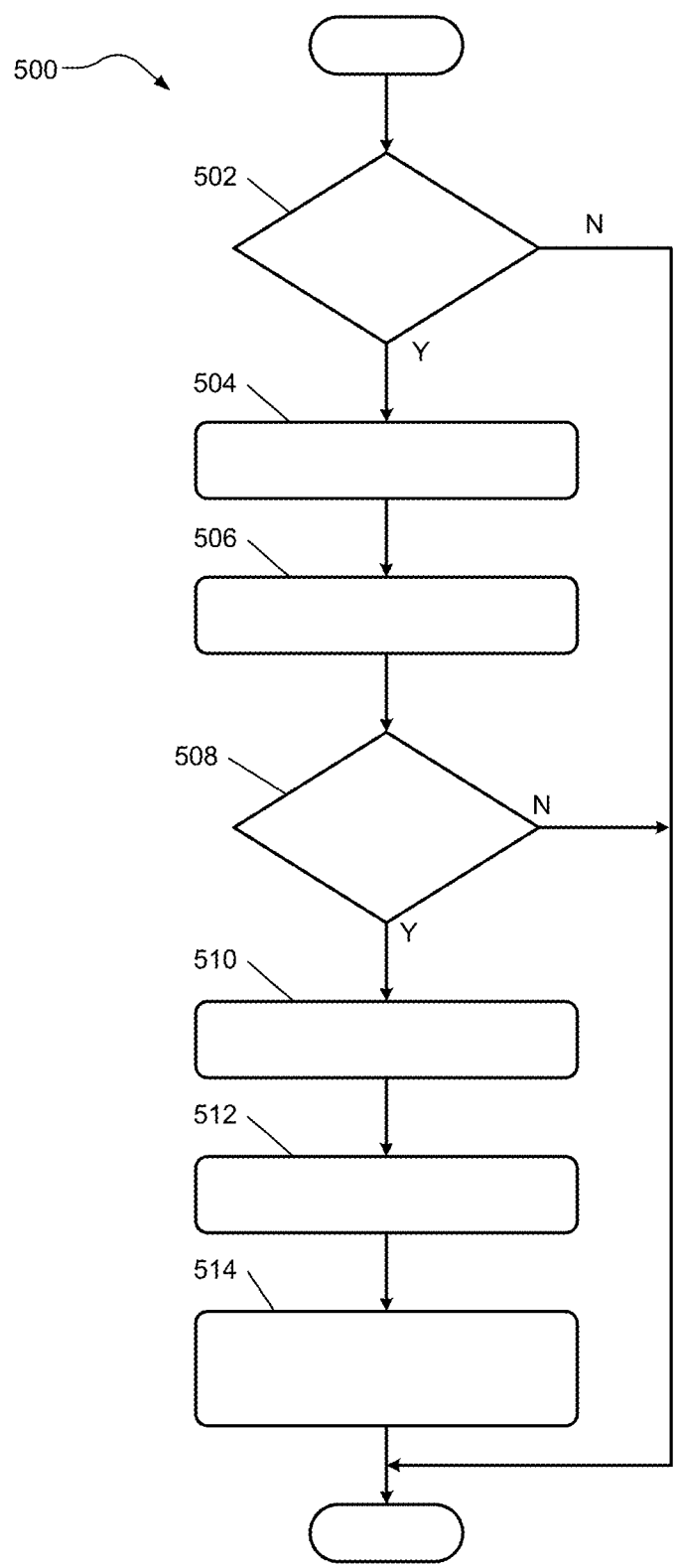
FIG. 5 is a flowchart of an example control process for predicting and warning users of potentially dangerous surface temperatures of a vehicle according to the present disclosure.

FIG. 5 illustrates an example control process 500 employable by the control module 102 of FIG. 1 for predicating and warning users of potentially dangerous surface temperatures of a vehicle, such as the vehicle 200 of FIG. 2. Although the example control process 500 is described in relation to the vehicle system 100 of FIG. 1 including the control module 102, the control process 500 may be employable by any suitable system. In the example of FIG. 5, the control process 500 may start when the vehicle system 100, the control module 102, etc. is powered-on and/or at another suitable time.

As shown in FIG. 5, control begins at 502 where the control module 102 determines whether the vehicle is off. For example, the control module 102 may determine when the vehicle transitions to an off mode (e.g., when the vehicle engine, motor, etc. is not running). In such examples, the vehicle is stationary and the control module 102 (and other accessories in the vehicle) may be powered. If no at 502, control may end as shown in FIG. 5. If yes at 502, control proceeds to 504.

At 504, the control module 102 receives data from internal and/or external sources. For example, and as explained herein, the control module 102 may receive data associated with the vehicle and data associated with an environment around the vehicle. For instance, the control module 102 may receive vehicle data and environment data from an internal source within the vehicle (e.g., the memory circuit 124 of FIG. 1 and/or another memory circuit in the vehicle) and/or an external source (e.g., a server, etc.) outside the vehicle. In such examples, the vehicle data may include, for example, the parked vehicle location, the vehicle heading, the vehicle pitch, the vehicle roll, the vehicle yaw, the color and/or material of the objects, etc. Additionally, the environment data may include, for example, the time of day (e.g., temporal data), the angle of the sun, current weather conditions (e.g., a current air temperature at or near the location of the vehicle, etc.), future weather conditions (e.g., a forecasted air temperature at or near the location of the vehicle, etc.), etc. Control then proceeds to 506.

At 506, the control module 102 may predict whether surfaces of vehicle objects have the potential to heat up to dangerous levels. For example, at 506, the control module 102 estimates potential surface temperatures of vehicle objects (e.g., seats, arm rests, center consoles, child car seats, internal/external door handles, trim, etc.) based on the received data. In such examples, such predictions of the surface temperatures may be determined through machine learning as explained herein. Control then proceeds to 508.

At 508, the control module 102 determines whether any of the estimated surface temperatures of the object is greater than a defined threshold (e.g., 118 degrees Fahrenheit, etc.). If no at 508, control may end as shown in FIG. 5 or return to 502 if desired. If yes at 508, control proceeds to 510.

At 510, the control module 102 may generate one or more recommendations to decrease object surface temperatures in the vehicle. For example, and as explained above, the control module 102 may suggest moving the vehicle, adjusting an interior vehicle shade in a particular zone, powering the vehicle on to activate a climate control module, etc. Control then proceeds to 512.

At 512, the control module 102 transmits an alert signal to a user communication device (e.g., the user communication device 138 of FIG. 1). In doing so, the control module 102 provides a notification to a user that objects in the vehicle may have potentially dangerous surface temperatures. Additionally, in some examples, the alert signal may be transmitted with the recommendation(s) generated at 510. Control then proceeds to 514.

At 514, the control module 102 may take actions to reduce the chances of the vehicle objects from reaching unsafe temperatures. For example, at 514, the control module 102 may automatically control a climate control module (e.g., the climate control module 126 of FIG. 1) in the vehicle to cool particular zones therein, thereby reducing potentially dangerous surface temperatures. Control may then end as shown in FIG. 5 or return to 502 if desired.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle system for selectively controlling airflow in a vehicle, the vehicle system comprising:

a plurality of temperature sensors positioned in the vehicle, the plurality of temperature sensors configured to measure surface temperatures of a first set of objects in the vehicle; and a control module in communication with the plurality of temperature sensors, the control module configured to:
receive the measured surface temperatures from the plurality of temperature sensors;
determine whether any of the measured surface temperatures is greater than a defined threshold;
receive vehicle data associated with the vehicle and environmental data associated with an environment around the vehicle, the vehicle data including one or more of a vehicle heading, a pitch of the vehicle, a yaw of the vehicle, and a latitude and longitude of the vehicle, and the environmental data including at least forecasted weather data;
estimate a surface temperature of a second object in the vehicle based on the received vehicle data and the environmental data;
determine whether the estimated surface temperature of the second object is greater than the defined threshold; and
in response to at least one of the measured surface temperatures and the estimated surface temperature being greater than the defined threshold, transmit an alert signal to a user communication device indicative of each of the first set of objects and the second object in the vehicle having the measured surface temperatures or estimated surface temperature greater than the defined threshold.

2. The vehicle system of claim 1, wherein the control module is configured to, in response to one of the measured surface temperatures being greater than the defined threshold, identify at least one zone in the vehicle that directs airflow to the object having the measured surface temperature that is greater than the defined threshold and selectively control a climate control module to cool the zone in the vehicle.

3. The vehicle system of claim 2, wherein the control module is configured to selectively control the climate control module to cool the zone in the vehicle until the measured surface temperature is less than the defined threshold.

4. The vehicle system of claim 1, wherein the control module is configured to:
determine whether one of the objects in the vehicle having the measured surface temperatures greater than the defined threshold is touched for a defined period of time; and
in response to determining that one of the objects is touched for the defined period of time, transmit an emergency signal to the user communication device.

5. The vehicle system of claim 1, wherein the plurality of temperature sensors includes at least one infrared temperature sensor.

6. The vehicle system of claim 1, wherein at least one temperature sensor of the plurality of temperature sensors is configured to measure a surface temperature of a seat, a center console, a steering wheel, an arm rest, or a child car seat.

7. The vehicle system of claim 1, wherein:
at least one temperature sensor of the plurality of temperature sensors is an infrared temperature sensor configured to measure a surface temperature of a seat, a center console, a steering wheel, an arm rest, or a child car seat; and the control module is configured to, in response to one of the measured surface temperatures being greater than the defined threshold, identify at least one zone in the vehicle that directs airflow to the object having the measured surface temperature that is greater than the defined threshold, and selectively control a climate control module to cool the zone in the vehicle until the measured surface temperature is less than the defined threshold.

8. A method for selectively controlling airflow in a vehicle, the method comprising:
receiving, from a plurality of temperature sensors, measured surface temperatures of first set of objects in the vehicle;
determining whether any of the measured surface temperatures is greater than a defined threshold;
receiving vehicle data associated with the vehicle and environmental data associated with an environment around the vehicle, the vehicle data including one or more of a vehicle heading, a pitch of the vehicle, a yaw of the vehicle, and a latitude and longitude of the vehicle, and the environmental data including at least forecasted weather data;
estimating a surface temperature of a second object in the vehicle based on the received vehicle data and the environmental data;
determining whether the estimated surface temperature of the second object is greater than the defined threshold; and
in response to at least one of the measured surface temperatures and the estimated surface temperature being greater than the defined threshold, transmitting an alert signal to a user communication device indicative of each of the first set of objects and the second object in the vehicle having the measured surface temperatures or estimated surface temperature greater than the defined threshold.

9. The method of claim 8, further comprising identifying at least one zone in the vehicle that directs airflow to at least one of the objects having with the measured surface temperature that is greater than the defined threshold and selectively controlling a climate control module to cool the zone in the vehicle.

10. The method of claim 9, wherein selectively controlling the climate control module to cool the zone in the vehicle includes selectively controlling the climate control module to cool the zone in the vehicle until the measured surface temperature is less than the defined threshold.

11. The method of claim 10, further comprising:
determining whether one of the objects in the vehicle having the measured surface temperatures greater than the defined threshold is touched for a defined period of time; and
in response to determining that one of the objects is touched for the defined period of time, transmitting an emergency signal to the user communication device.

12. The method of claim 8, wherein the plurality of temperature sensors includes at least one infrared temperature sensor.

13. The method of claim 12, wherein receiving surface temperatures of objects in the vehicle includes receiving surface temperatures of a seat, a center console, a steering wheel, an arm rest, and/or a child car seat.

14. A method for warning users, the method comprising:
receiving vehicle data associated with the vehicle and environmental data associated with an environment around the vehicle, the vehicle data including one or more of a vehicle heading, a pitch of the vehicle, a yaw of the vehicle, and a latitude and longitude of the vehicle, and the environmental data including at least forecasted weather data;

estimating a surface temperature of an object of the vehicle based on the received vehicle data and the environmental data;

determining whether the estimated surface temperature of the object is greater than a defined threshold; and in response to determining the estimated surface temperature of the object is greater than the defined threshold, transmitting an alert signal to a user communication device to notify a user of the object having the estimated surface temperature greater than the defined threshold.

15. The method of claim 14, wherein:

the method further comprises generating one or more recommendations to decrease the estimated surface temperature of the object in response to determining the estimated surface temperature of the object is greater than the defined threshold; and transmitting the alert signal to the user communication device includes transmitting the alert signal with the one or more recommendations.

16. The method of claim 15, further comprising controlling a climate control module in the vehicle to cool the object in response to determining the estimated surface temperature of the object is greater than the defined threshold.

17. The method of claim 16, wherein:

the vehicle data further includes one or more of a color of the object in the vehicle and a material type of the object in the vehicle; and the environmental data further includes one or more of current weather data, a time of the year, an angle of the sun, and temporal data.

18. The method of claim 14, wherein the object includes a component external to the vehicle.

19. The method of claim 14, further comprising estimating a time of when the surface temperature of the object in the vehicle will be greater than the defined threshold based on the received data, wherein transmitting the alert signal to the user communication device includes providing a notification identifying the estimated time of when the surface temperature of the object in the vehicle will be greater than the defined threshold.

20. The method of claim 14, further comprising estimating a time of when the surface temperature of the object in the vehicle will be less than the defined threshold based on the received data, wherein transmitting the alert signal to the user communication device includes providing a notification identifying the estimated time of when the surface temperature of the object in the vehicle will be less than the defined threshold.

* * * * *